Figure 1:
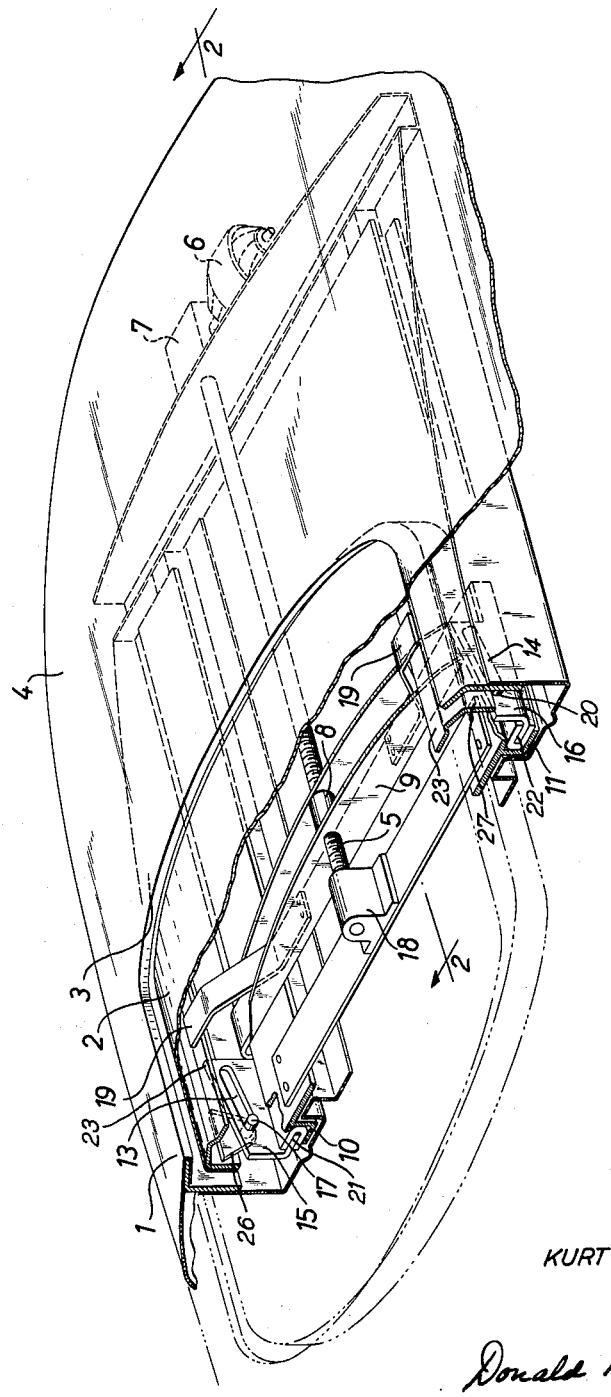

April 24, 1962   K. LARCHÉ   3,031,226
RIGID SLIDING ROOF FOR VEHICLES
Filed March 24, 1960   2 Sheets-Sheet 1

INVENTOR.
KURT LARCHÉ

BY Donald R. Fraser

ATTORNEY.

April 24, 1962 K. LARCHÉ 3,031,226
RIGID SLIDING ROOF FOR VEHICLES
Filed March 24, 1960 2 Sheets-Sheet 2

Inventor:
Kurt Larché
by [signature]
Attorney

United States Patent Office 3,031,226
Patented Apr. 24, 1962

3,031,226
RIGID SLIDING ROOF FOR VEHICLES
Kurt Larché, Munich-Pasing, Germany, assignor to Wilhelm Baier K.G., Stockdorf, near Munich, Germany
Filed Mar. 24, 1960, Ser. No. 17,300
Claims priority, application Germany Mar. 25, 1959
3 Claims. (Cl. 296—137)

The invention relates to a rigid sliding roof for vehicles, in particular motor vehicles, constructed in such a manner that the sliding-cover is part of the solid roof, if closed, and when opened moves on an internally-threaded nut affixed to a threaded shaft into a compartment which is located between the inner upholstery of the roof and the outer part of the roof.

There are already roof covers known for motor vehicles where the sliding cover exists of gliding devices on the sides which have a number of gliding and rolling parts which terminate in curved rails if the power mechanism consisting of an axle and a threaded nut affixed to it is operated. In that case the sliding cover is lifted outside the frame of the roof, and if opened, is located outside the vehicle above the solid roof. Such a construction does not only fail to meet the demands as far as appearance is concerned with respect to sliding roofs, but also if the roof surface is large it makes noise at high speeds. An additional detriment with the roofs now in use is the threaded shaft which, if the roof is closed, is located below the sliding cover and separates the opening into two parts if the roof is opened.

An object of the present invention is to further improve the construction described above by arranging the threaded shaft in the compartment where the sliding cover can be moved when opening the roof.

This not only has the advantage that the threaded shaft is not visible and the openings in the front part of the roof are eliminated, but it also permits a simpler power mechanism if the axle is arranged according to this invention.

The effect of the present invention will result instead of a threaded shaft consisting of two parts for the roof to be slid into the vehicle, a single continuous threaded shaft will be used, located at the sides of the roof in the direction of the driver and as much in the center as possible as far as the sides of the roof are concerned.

It will be possible to develop the described construction for further practical use if a sliding carriage is made integral with the threaded nut affixed to the threaded shaft which carriage is controlled by rails located in the sides of the roof. It is further very advantageous to affix to this carriage a mechanism to lift or lower the sliding cover. The power mechanism, which operates very stably and with a minimum of noise, has the additional advantage that it requires very little power and can be installed quickly and manufactured cheaply.

It is also very advantageous to affix a spring to the carriage which applies pressure on the end of the sliding cover in the direction of the interior of the vehicle. This not only eliminates rattling but this arrangement can also be used advantageously for the mechanism lifting or lowering the sliding cover which is located on the carriage.

If the threaded shaft is powered by an electric motor, this invention can be greatly improved with regard to easy installment, minimum power consumption and utilization of space if the power mechanism is also located in the compartment of the roof. If this case, an arrangement is particularly desirable where the end of the threaded shaft opposite the power motor is located at the end of the sliding cover which can be lowered.

The drawing explained hereafter shows an example to which this invention is by no means limited, particularly as far as the lifting and lowering mechanism and the power mechanism for the threaded shaft are concerned. The description shows additional characteristics and advantages of the invention, and makes suggestions for the modification and further development of the proposed sliding roof.

Figure 2:
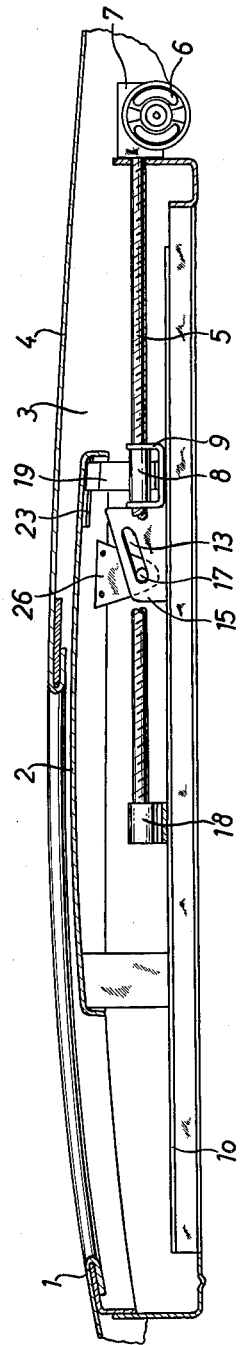

Other objects and advantages of the invention will be apparent from the following detailed description and the attached drawings, in which:

FIG. 1 is a perspective view partly in section of a sliding roof made in accordance with the invention shown with the cover in its nearly closed position; and FIG. 2 is a longitudinal sectional view of the invention taken along line 2—2 of FIG. 1 showing the cover in a partially open position.

Referring to FIGS. 1 and 2, there is shown a sliding cover 2 disposed within the corresponding opening in the frame of a vehicle roof 1. The sliding cover 2 is shown in a lowered position just prior to being fully seated within the opening of the roof 1 or just prior to being driven to its fully opened and concealed position as will be explained in greater detail hereinafter.

In order to effect movement of the sliding roof 2 into or out of the storage compartment 3 defined by outside portion 4 of the vehicle roof and the inner upholstery which is not specifically shown, there is provided a threaded shaft 5 journalled at one end thereof in a bearing element 18 and driven at the opposite end by an electric motor 6 and a gear reduction unit 7. The threaded shaft 5 is threadably engaged within an internally threaded nut or sleeve 8 which, in turn, is integral with a carriage unit comprised in part of a pair of upstanding transversely extending spaced apart members 9. The opposite end portions of the carriage unit terminate in downwardly depending arms with inwardly extending flanges 21 and 22 adapted to ride on suitable rails 10 and 11, respectively.

Of particular importance is the lifting and lowering mechanism for the sliding top 2 which comprises a pair of upstanding plates 15 and 16 integral and movable with the carriage unit. The plates 15 and 16 are provided with angled slots 13 and 14, respectively.

At each side of an inner flange 23 of the sliding cover 2, there are downwardly depending brackets 26 and 27, each being provided with an inwardly extending pin 17 and 20, respectively. As is clearly visible at one side of the roof structure, the pin 17 is adapted to be received and ride within its respective slots 13. A similar arrangement is effected between the pin 20 and its associated slot 14. If, in the position of the roof shown in the drawings, the threaded nut or sleeve 8 is caused to move in the direction toward the bearing 18, the pins 17 and 20 are cammed upwardly in their respective slots 13 and 14, thereby lifting the sliding cover 2 to its fully closed position. If thereafter the threaded sleeve 8 and its associated carriage unit is caused by the threaded shaft 5 to be driven in an opposite direction, the pins 17 and 20 slide in their associated slots 13 and 14 to lower the sliding cover 2 and upon continued movement of the carriage unit away from the bearing element 18, the sliding cover 2 is moved into the storage compartment 3.

In order to prevent the sliding cover from being accidentally lifted if an attempt is made to close it, a leaf-type spring arrangement comprised of upwardly and outwardly extending spring arms 19 is employed. One end of each of the spring arms 19 is welded or otherwise suitably secured to the carriage unit, and the other free end acts to contact the inner marginal flange 23 thereby to push the flange 23 downwardly and make a raising of the cover 2 possible only if the cover is at its farthest forward position. Manifestly, satisfactory results can be achieved with the use of a coil spring instead of the leaf spring 19.

It will be appreciated from the above description that the pins 17 and 20 and their respective brackets 26 and 27 comprise the only connection between the carriage unit and the sliding cover 2 with the exception of the spring arms 19. The cover 2 may be moved rearwardly into an opened position by the brackets which act to pull their associated pins backwards. When moved in the opposite or forward direction, the same parts slide toward the bearing 18 to a point where the pins in their slots are cammed upwardly. Such camming action is effected when the sliding resistance exceeds the lifting resistance which is dependent upon the weight of the cover 2, and the small frictional resistance and strength of the spring 19. In the closed position, when the front end of the cover 2 touches the front frame of the roof opening 1, the sliding resistance exceeds lifting resistance and, therefore, the cover will be lifted in the described manner on further movement of the carriage unit towards the bearing 18.

In order to facilitate the access to the gear reduction unit 7 for possible repairs and adjustments, the provision of an access opening in the interior of the vehicle immediately below the gear reduction unit 7 would be useful.

It should be further noted that the distance between the rear edge of the roof opening and the bearing element 18 has been enlarged in the drawing to make it more clearly understandable, actually the distance is approximately only four centimeters.

In accordance with the patent statutes, I have explained the principles and mode of operation of my invention, and as illustrated and described what I now consider to represent its best embodiment. However, I desire to have it understood that, within the scope of the appended claims, the invention may be practiced otherwise than as specifically illustrated and described.

What is claimed as new and desired to be secured by Letters Patent is:

1. A rigid roof for vehicles comprising an opening in the roof, guide rails affixed to said vehicle beneath the roof thereof, a cover coextensive with the opening in the vehicle roof, a rotatably mounted externally threaded shaft, motor means for imparting rotary movement to said shaft, an internally threaded sleeve assembly threadably engaging said shaft and adapted for movement along said shaft upon rotary movement of said shaft, the terminal end portions of said assembly adapted to ride on said guide rails and provided with upstanding brackets, each of said brackets having an angularly extending slot, pins affixed to said cover and each adapted to slide within the slot of the respective one of said brackets, whereby when the cover is seated within the opening of the vehicle roof and movement of said sleeve assembly is effected by movement of said threaded shaft, said pins and the associated cover are initially rammed downwardly by the slots in said brackets, and upon continued movement of said sleeve assembly the cover is carried along said guide rails parallel to the axis of said shaft by said brackets and said pins, which form the connection between the cover and the sleeve assembly.

2. A rigid roof for vehicles, comprising a rigid roof panel having an opening therein, a sliding cover having a front end and a rear end and adapted to be seated within and movable into and out of the opening in said roof panel, rail guide means for said cover, externally threaded shaft means located under a portion of said roof panel under which said sliding cover is adapted to be moved, power means for driving said shaft means, a carriage unit guided in said rail guide means at the sides of said roof panel including an upstanding bracket with an angularly upwardly extending slot formed therein, a pin member attached to said cover adjacent the rear end thereof and adapted to slide within the slot formed in said bracket for effecting generally vertical movement of said cover, and a sleeve assembly engaging said shaft means and mounted on said carriage unit, said sleeve assembly being moved by said shaft means under said fixed portion of the roof when driven by said power means to effect a to and fro movement of said carriage unit and said cover.

3. A rigid roof as defined in claim 2 including spring means for urging said cover downwardly toward said carriage unit.

References Cited in the file of this patent

UNITED STATES PATENTS 1,966,540     Decoux _____ July 17, 1934

FOREIGN PATENTS 1,090,528     France _____ Mar. 31, 1955